3,232,877
NICKEL FERRITE CONTAINING COBALT AND MANGANESE
Avénir Vassiliev, Jean Nicolas, and Mieczyslaw Hildebrandt, Paris, France, assignors to Compagnie Generale de Telegraphie Sans Fil, a corporation of France
No Drawing. Filed Dec. 4, 1961, Ser. No. 156,972
Claims priority, application France, Dec. 6, 1960, 846,017
1 Claim. (Cl. 252—62.5)

The present invention relates to ferrite material used in ultrahigh-frequency techniques and, more particularly, to ferrite materials used in unidirectional devices of the resonant isolator type.

It is known that when such devices are submitted to high energy waves, their insulation characteristics undergo a modification related to two different factors:

(1) The isolation factor is modified when the power applied exceeds a certain peak. This power may depend upon the freqeuncy or the geometry of the ferrite piece, and also upon the position thereof in the wave-guides which form the isolator. Under given conditions, this peak power also depends upon the nature of the ferrite.

(2) *A considerable temperature increase of the ferrite.*—These characteristic variations as a function of temperature may be explained as follows:

The "saturation moment" of the ferrite decreases as temperature increases. This decrease is the smaller, in the vicinity of the ambient temperature, as the Curie point is higher; it is thus advantageous to use a ferrite having as high a Curie point as possible.

This variation of the saturation moment affects the value of the internal field for which the resonance occurs.

It is therefore an object of the invention to provide a ferrite material, the saturation moment and internal field of which vary little as a function of the ultrahigh-frequency energy applied to a ferrite piece used in a resonant isolator.

The composition according to the invention comprises approximately by molecules:

| | Percent |
|---|---|
| $Fe_2O_3$ | 48.22 |
| NiO | 48.22 |
| CoO | 2.14 |
| $MnO_2$ | 1.01 |

The invention will be best understood from the following non limitative example:

*Example*

Two basic mixtures are provided.

A first mixture comprises:
 182.5 g. pure $Fe_2O_3$
 89.628 g. NiO (free of Co)
 2.09 g. $MnO_2$ (purity higher than 90%)

A second mixture comprises:
 60.6 g. $Fe_2O_3$
 33.68 g. CoO
 0.696 g. $MnO_2$

These two mixtures are separately crushed in presence of distilled water. They are then separately presintered at 950° C., during two hours, whereafter 100 g. of the first mixture are mixed with 4 g. of the second mixture.

After crushing in the presence of distilled water, the whole mixture is dried, transformed in granules by addition of a known binding agent, for instance essentially consisting of polyvinyl alcohol and compressed under a pressure of 1000 kg./sq. cm. The pieces obtained are then sintered during two hours in the air at a temperature of 1300° C., and are then cooled at a rate of about 30° C. per hour.

The resulting material has a high density, low dielectric losses when operating at microwave freqeuncies and varies but little, as a function of the energy applied to its input, up to medium and very high peak powers.

The cobalt and manganese oxides contents of the above composition may be varied within ±10% of the above contents, while the iron oxide controls may also vary very slightly, within less than ±1% of said contents.

Upon deviating from these limits, it is found that the variation of the characteristics of the material as a function of power is rapidly increasing.

It is to be understood that the details of the process as described hereinabove are not limitative. It is however preferred to proceed by preparing separate mixtures, as shown; this allows a more accurate adjustment of the various proportions of the constituents, resulting in a more homogeneous product.

What is claimed is:

A ferrite composition consisting essentially of

| | Percent by molecules |
|---|---|
| $Fe_2O_3$ | 48.22±0.48 |
| NiO | 48.22±0.48 |
| CoO | 2.14±0.21 |
| $MnO_2$ | 1.01±0.1 |

References Cited by the Examiner

UNITED STATES PATENTS 3,015,788   1/1962   Sirvetz _____ 252—62.5
3,023,165   2/1962   Van Uitert _____ 252—62.5

FOREIGN PATENTS 803,625   10/1958   Great Britain.

TOBIAS E. LEVOW, *Primary Examiner.*

JOSEPH R. LIBERMAN, MAURICE A. BRINDISI,
*Examiners.*
S. R. BRESCH, R. D. EDMONDS,
*Assistant Examiners.*